United States Patent [19]
Dockery et al.

[11] Patent Number: 5,979,010
[45] Date of Patent: *Nov. 9, 1999

[54] WINDSHIELD WASHER AND WIPER ASSEMBLY

[76] Inventors: Daryl Dockery; Denzel Dockery, both of Hwy. 90 West, P.O. Box 168, Ponce de Leon, Fla. 32455-0168

[ * ] Notice: This patent is subject to a terminal disclaimer.

[21] Appl. No.: 09/099,805

[22] Filed: Jun. 18, 1998

Related U.S. Application Data

[63] Continuation-in-part of application No. 08/950,830, Oct. 15, 1997, Pat. No. 5,799,359.
[51] Int. Cl.$^6$ .................................. B60S 1/46; B60S 1/52; B60S 1/78
[52] U.S. Cl. ................. 15/250.04; 15/250.4; 15/250.451
[58] Field of Search .............................. 15/250.04, 250.4, 15/250.41, 250.48, 250.361, 250.03, 250.01, 250.451, 250.19, 250.1; 239/284.1, 284.2

[56] References Cited

U.S. PATENT DOCUMENTS

| | | | |
|---|---|---|---|
| 3,431,577 | 3/1969 | Minsky | 15/250.04 |
| 3,548,440 | 12/1970 | Kothari | 15/250.1 |
| 3,849,827 | 11/1974 | Coropolis et al. | 15/250.01 |
| 4,123,817 | 11/1978 | Hortery | 15/250.04 |
| 4,847,940 | 7/1989 | Bradbury | 15/250.4 |
| 5,799,359 | 9/1998 | Dockery et al. | 15/250.04 |

FOREIGN PATENT DOCUMENTS

| | | | |
|---|---|---|---|
| 2704817 | 11/1994 | France | 15/250.04 |
| 3934203 | 4/1991 | Germany | 15/250.4 |
| 80/01155 | 6/1980 | WIPO | 15/250.4 |

*Primary Examiner*—Gary K. Graham
*Attorney, Agent, or Firm*—George A. Bode; Daniel E. Maddux; Bode & Associates

[57] ABSTRACT

A windshield washer and wiper assembly for cleaning a windshield of an automobile. The assembly is generally comprised of an elongated housing, a source of windshield washer fluid under pressure, a perforated bladder within the housing, means for washing the windshield mounted through the housing in contact with the bladder, a wiper blade mounted on the housing and means for deflating the bladder. The bladder, upon actuation of the washer fluid source, inflates with washer fluid, urging the washing means against the windshield while simultaneously disengaging the wiper blade from the windshield and leaking washer fluid onto the windshield. The bladder returns to a contracted state by the deflating means upon deactivation of the washer fluid source to return the wiper blade to the windshield surface.

20 Claims, 7 Drawing Sheets

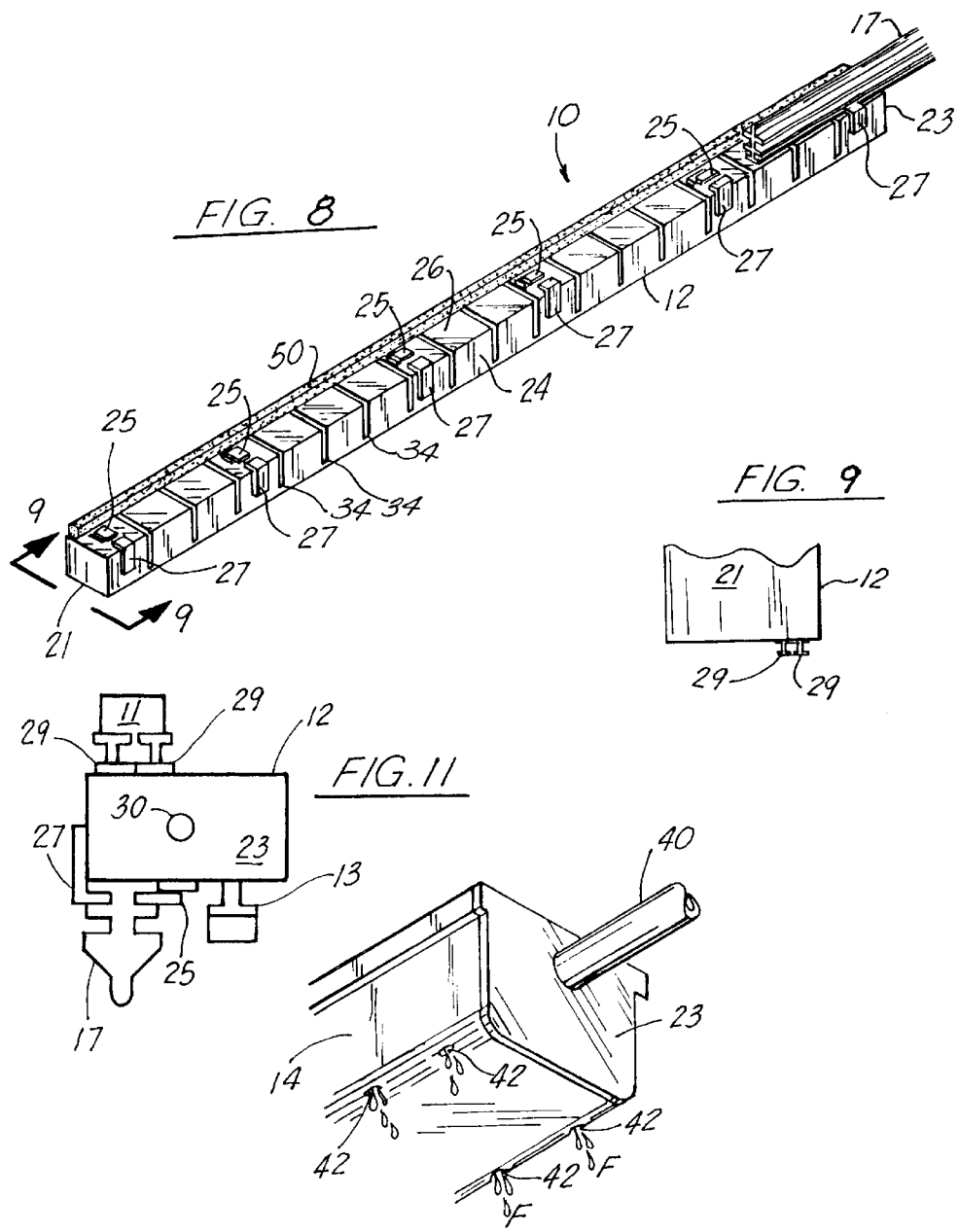

WINDSHIELD WASHER AND WIPER ASSEMBLY

This application is a continuation-in-part application of a previous application by the same inventor bearing U.S. Ser. No. 08/950,830 filed Oct. 15, 1997, now U.S. Pat. No. 5,799,359. The entire previous application is incorporated herein by reference as if set forth in full below.

BACKGROUND OF THE INVENTION

1. Field of the Invention

The present invention relates to an assembly for washing and wiping the windshield of an automobile, particularly an improved windshield washer and wiper assembly capable of removing solid matter such as dried insect debris from the windshield of an automobile.

2. General Background

All automobiles are equipped with windshields or wind screens which require periodic cleaning while the vehicle is in operation. All such vehicles are likewise equipped with windshield wipers which are adapted to move in a back-and-forth motion in order to sweep across a major portion of the windshield and remove water therefrom. Conventional windshield wipers are adapted to function in a "squeegee" manner—that is, the rubber windshield wiper blades scrape across the windshield surface and remove water therefrom. Most automobiles produced after the early 1970's are also provided with windshield washer fluid delivery systems, wherein cleaning fluid may be delivered under pressure to the windshield to aid the windshield wipers in removing dirt or dust therefrom. Windshield wipers have been designed so that they bear against the windshield with a moderate amount of force sufficient to sweep the surface of the windshield clean, but generally not enough to effect any scrubbing action by the wiper blade, since the purpose of the wiper blade is to remove water.

The problem that has existed for some time is that when solid matter such as flying or airborne insects impact against the windshield of a rapidly moving automobile, the body fluids of the insect, and to some degree the exterior body parts, adhere to the windshield and are quickly dried thereon. The resulting windshield smear is, for the most part, impossible to remove by the squeegee action of a conventional windshield wiper blade, even when assisted with windshield washing fluid.

Several devices have been patented which are aimed at removing solid matter from the windshield of an automobile.

Patent Cooperation Treaty (PCT) International Publication No. WO 80/01155 discloses, as best seen in FIGS. 2–4, a combination scrubber/wiper system for a vehicle windshield that has a jacking means 14 which, in use, can urge brush 44 toward and against windscreen 48, then causing the wiper blade 10 to be lifted out of contact with windscreen 48, and can cause or permit withdrawal of brush 44, thereby permitting the wiper blade 10 to reengage windscreen 48. Jack 14 is pneumatically actuated with a spring return 37; in particular, cylinder 26 is connected by passage 36 to hose 38 through which air can be supplied and exhausted to actuate jack 14. Also, the operation of the device is associated with the operation of a windscreen washer, as water can be delivered through a perforated pipe extending along the length of brush 44.

U.S. Pat. No. 4,649,593 issued to J. C. Gilliam, III, et al., and entitled "Windshield Wiper And Cleaner" teaches, as best disclosed in FIGS. 1–3, a combined windshield wiping and cleaning device that has a scrubbing member 3 with a reticular surface 7 covered by mesh 6 for removing solid matter along with a wiper blade 2 for squeegee removal of water. Scrubber 3 and wiper blade 2 are formed together with a supporting base as a single monolithic extrusion 1 of an elastomeric material which fits into the windshield wiper arm in the conventional manner.

U.S. Pat. No. 4,567,621 issued to R. L. Alley, Jr., and entitled "Composite Windshield Wiper Assembly" discloses, as best seen in FIGS. 2, 4 and 5, a windshield wiper assembly that also has a window wiper and scrubber in combination as an integral unit. The assembly A has a pair of spaced wiper blade elements 42 and 44 having thin resilient wiping edges 42a and 44a, respectively, and scrubbing block 50 in the space between blade elements 42 and 44. The scrubbing block 50 includes a protrusion 52 which extends past the wiping edges 42a and 44a to provide a light scrubbing action against windshield 12.

U.S. Pat. No. 4,327,457 issued to Dayco Corporation on the application of B. R. Lunsford and entitled "Windshield Wiper And Method Of Making Same" discloses, as best seen in FIGS. 1, 4 and 8, another window wiper and scrubber combination 30 which comprises a pair of wiping members 32 in spaced-apart relationship and a cleaning member 33 disposed therebetween, cleaning member 33 has a semi-cylindrical portion 35 which is adapted to engage the windshield surface 12 roughly midway between wiping members 32 during cleaning movements of the device.

U.S. Pat. No. 3,849,827 issued to The B.F. Goodrich Company on the application of J. P. Coropolis, et al., and entitled "Window Washer Seal Assembly" discloses, as best seen in FIGS. 1–3, a windshield wiper assembly 10 that inflates so that the wipers 12 and 13 engage the surface of the windscreen 25 yet at the same time sprays washer fluid 37 from reservoir 36. An inflatable resilient tube or bladder 11 carries the pair of blades 12 and 13 engagable with the windscreen 25. Washer fluid 37 is pumped (35) into the tube 11 between blades 12 and 13 and ejected through the holes 26 in the tube 11. One of the blades 12 or 13 may extend into engagement with windscreen 25 in the deflated condition of tube 11 for sealing the space between the tailgate and windscreen 25 and at least one of the blades 12 or 13 may be brought into wiping engagement with windscreen 25 upon inflation of tube 11 during the washing operations.

Other patents present in the art are U.S. Pat. No. 4,060,872 entitled "Windshield Wiper And Washer"; U.S. Pat. No. 3,871,049 entitled "Window Wiper Assembly"; and U.S. Pat. No. 4,754,517 entitled "Windshield Wiper Blade"; all of which are directed to cleaning a windshield of an automobile, but do not meet the needs of the assembly of the present invention.

The apparatus of PCT International Publication No. WO 80/01155 is overly complex, requiring a source of compressed air to actuate the device. Furthermore, the device is not easily installed on the wiper arm of an automobile; the device must be mounted with bolts.

The devices of U.S. Pat. Nos. 4,649,593; 4,567,621; 4,327,457; 3,849,827; 4,060,872; 3,871,049; and 4,754,517 all do not use conventional wiper blades such as come equipped with an automobile. Furthermore, the devices of U.S. Pat. Nos. 4,327,457; 3,849,827; and 3,871,049 are designed to work on non-oscillating wiper arms. Also, the devices of U.S. Pat. Nos. 4,327,457; 3,849,827; 4,060,872 and 3,871,049 do not use a brush to clean solid matter from the windshield of an automobile.

Thus, a need exists for a windshield washer and wiper assembly for cleaning solids from the windshield of an automobile which combines the function of cleaning and scrubbing solid matter with the function of wiping and squeegee removal of fluid in a single element through the proper combination of scrubbing, fluid application and squeegee action.

A need also exists for an assembly with the above features which is easily installed and operated in the standard wiper arm assembly now commonly used to perform only the wiping or squeegee removal of water on the windshield of an automobile.

A need also exists for an assembly with the above features which can use a conventional wiper blade such as comes equipped with an automobile.

Also, a need exists for an assembly with the above features which operates on an oscillating wiper arm of an automobile.

A need also exists for an assembly with the above features which is simple in design and easy and economical to manufacture.

SUMMARY OF THE PRESENT INVENTION

The preferred embodiment of the assembly of the present invention solves the aforementioned problems in a straight forward and simple manner. What is provided is an assembly for washing and wiping a windshield of an automobile, the automobile having a windshield wiper arm affixed to motor means for moving the wiper arm in an oscillating motion and the assembly comprising an elongated housing, a bladder within the housing, a source of windshield washer fluid under pressure, means for washing the windshield mounted through the housing, a wiper blade mounted on the housing and means for deflating the bladder.

The housing has a top side, bottom side, front side, rear side, and a pair of ends. One of the ends has a hole for coupling the housing to the washer fluid source. A slot runs the length of the bottom of the housing. The housing has a series of grooves spaced intermittently along the length of the housing. The grooves run through the front side, top side and rear side and are perpendicular to the slot. The housing has first mounting means for slidably mounting the housing to the wiper arm of the automobile, the first mounting means being mounted on the top side of the housing. The housing also has second mounting means for slidably mounting the wiper blade to the bottom side of the housing, the second mounting means being mounted on the rear side and the bottom side to the rear of the slot.

A bladder is located inside the housing. The bladder has an outlet which extends through the hole in one end of the housing and couples the washer fluid source to the bladder. A series of perforations runs the length of the bladder. The bladder is normally in a deflated state.

The washing means is mounted through the slot in the housing and in contact with the bladder. The washing means is not in contact with the windshield when the bladder is deflated.

The wiper blade is a conventional wiper blade such as comes equipped on automobiles and is in contact with the windshield when the bladder is deflated.

The deflating means deflates the bladder when the washer fluid source stops supplying washer fluid to the bladder, causing the washing means to disengage the windshield and the wiper blade to reengage the windshield.

In operation, the assembly is slidably mounted on the wiper arm of the automobile such that the wiper blade and the washing means are facing the windshield, with the wiper blade engaging the windshield and the washing means not engaging the windshield. The source of windshield washer fluid under pressure is coupled to the bladder through the outlet in the bladder. Upon actuation of the source of windshield washer fluid under pressure, the washer fluid source supplies washer fluid under pressure to the bladder. The bladder inflates with washer fluid, urging the washing means outwardly against the windshield. As the washing means engages the windshield, the wiper blade is simultaneously disengaged from the windshield. Washer fluid leaks from perforations in the bladder through the housing and down the washing means to wet the windshield. As the wiper arm moves back and forth in an oscillating motion, washer fluid wets the windshield and the washing means scrubs solid matter from the windshield, thereby cleaning the windshield. After a predetermined time, the washer fluid source stops supplying washer fluid to the bladder. The deflating means deflates the bladder, retracting and disengaging the washing means from the windshield and reengaging the wiper blade to the windshield. The oscillating motion of the wiper arm allows the wiper blade to wipe away any remaining washer fluid from the windshield.

In view of the above, it is an object of the present invention to provide a windshield washer and wiper assembly for cleaning solids from the windshield of an automobile which combines the function of cleaning and washing solid matter with the function of wiping and squeegee removal of fluid in a single element through the proper combination of washing, fluid application and squeegee action.

It is a further object of the present invention to provide such an assembly with the above features which is conveniently installed and operated in the standard wiper arm assembly now commonly used to perform only the wiping or squeegee removal of water on windshields.

It is another feature of the present invention to provide an assembly with the above features which can use a conventional wiper blade such as comes equipped with an automobile.

Another object of the present invention is to provide an assembly with the above features which operates on an oscillating wiper arm of an automobile.

In view of the above objects it is a feature of the present invention to provide an assembly with the above features which is simple in design and easy and economical to manufacture.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 8 is a top perspective view of the assembly of the present invention shown in FIGS. 4 and 5, illustrating how the wiper blade is mounted to the housing;

FIG. 9 is a partial cross-sectional end view of the assembly of FIG. 8, taken along line 9—9 of FIG. 8; and, FIG. 10 is a partial bottom end perspective view of the bladder of FIG. 3, showing the opposite end of the bladder;

FIG. 11 is an end view of the assembly of FIG. 8, illustrating how the assembly is mounted between the wiper arm and the wiper blade;

DETAILED DESCRIPTION OF THE PREFERRED EMBODIMENT

Figure 1:
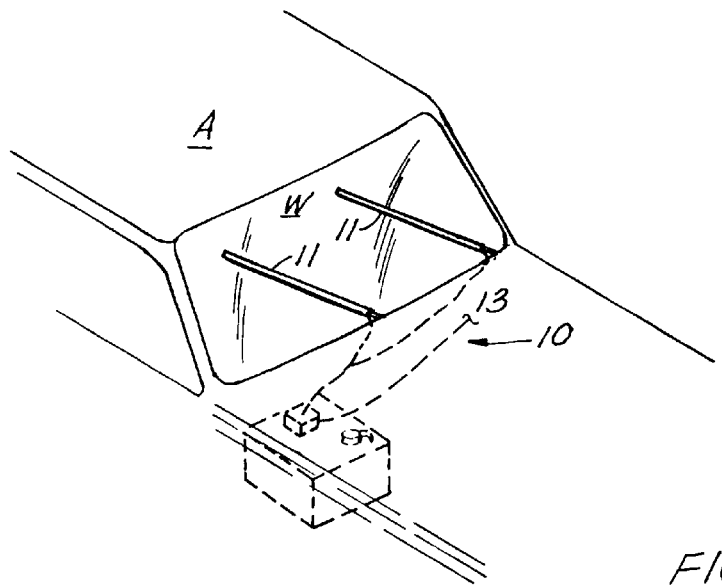
FIG. 1 is a partial fragmentary perspective view of the preferred embodiment of the assembly of the present invention mounted to the windshield wiper system of an automobile.

Referring now to the drawing, and in particular FIG. 1, the preferred embodiment of the assembly of the present invention is designated generally by the numeral 10. Assembly 10 is mounted on wiper arms 11 of conventional automobile A having windshield W. Wiper arms 11 are affixed to motor means on automobile A such that upon actuation, wiper arms 11 oscillate in a back and forth motion across windshield W. Assembly 10 is generally comprised of elongated housing 12, bladder 14 located inside housing 12, source of windshield washer fluid under pressure 13, washing means 16 for washing windshield W, wiper blade 17 and deflating means 18 for deflating bladder 14, as best seen in FIGS. 1, 4 and 5.

Figure 5:
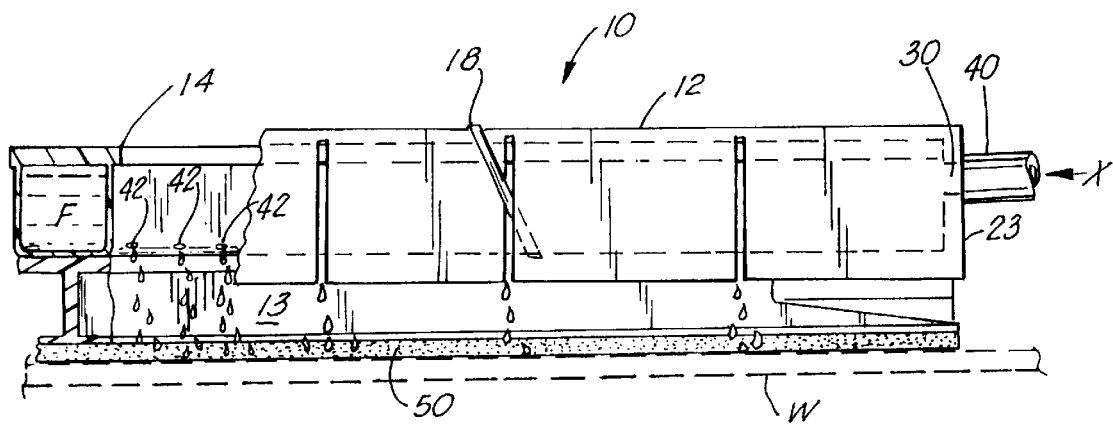
FIG. 5 is another fragmentary side view of the embodiment of FIG. 4, shown in its operative condition, with the housing partially cut away to illustrate the bladder within the housing.
Figure 6:
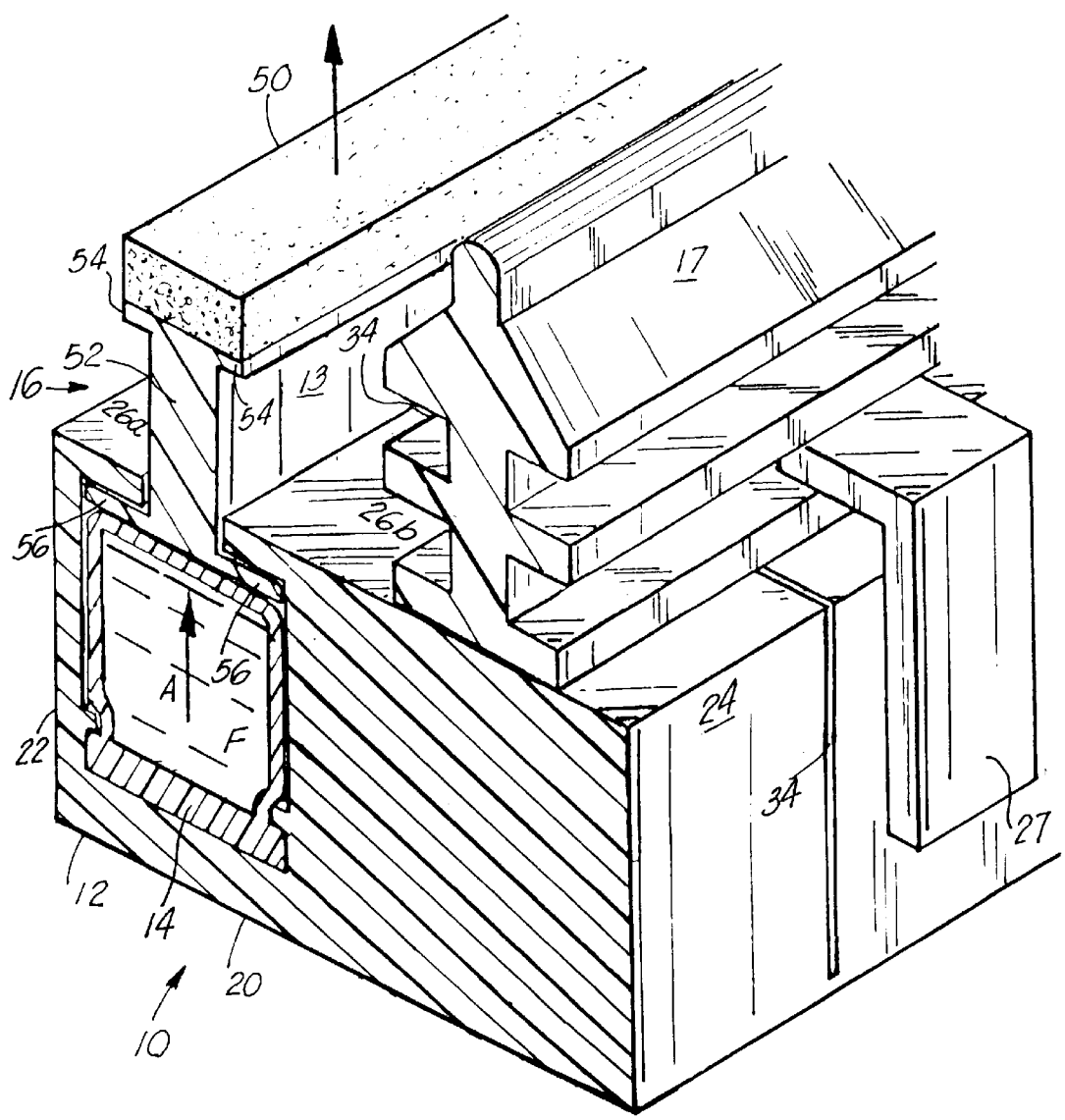
FIG. 6 is a bottom end perspective view of the embodiment of FIGS. 4 and 5 with one end of the housing removed, illustrating the assembly in its operative position and how the wiper blade is inserted onto the housing.
Figure 7:
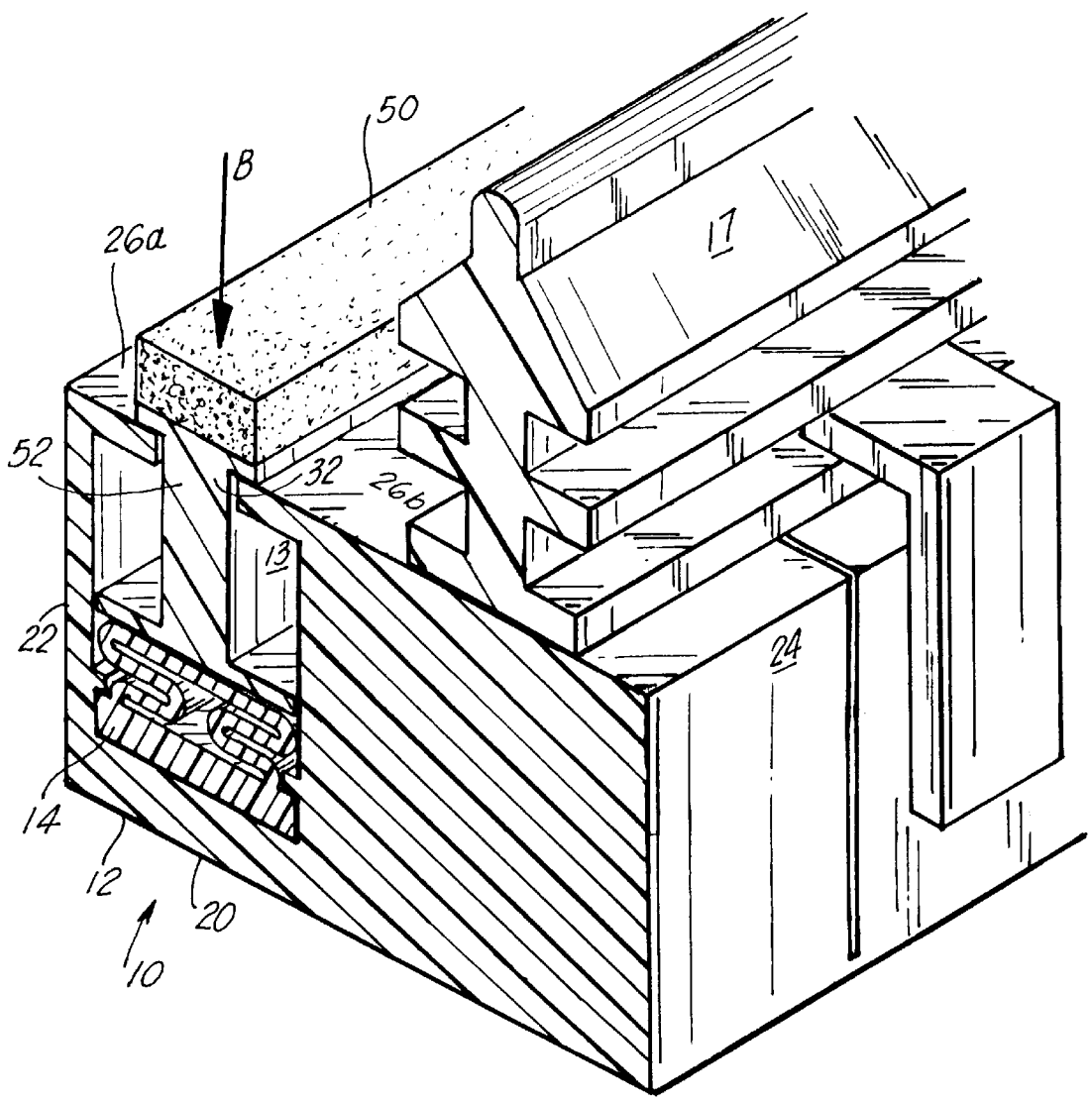
FIG. 7 is another bottom end perspective view of the embodiment of FIG. 6 with one end of the housing removed, illustrating the assembly in its inoperative position and how the wiper blade is inserted onto the housing.

Housing 12 has top side 20, front side 22, rear side 24, bottom side 26, and ends 21 and 23, as best seen in FIGS. 6, 7 and 8. End 23 has hole 30 for coupling washer fluid source 13 to bladder 14, as best seen in FIGS. 5 and 11. Housing 12 has slot 32 which extends the length of bottom side 26, dividing bottom side 26 into front bottom side 26a and rear bottom side 26b, as best seen in FIGS. 6, 7 and 8. Housing 12 also has a series of grooves 34 spaced intermittently down the length of housing 12, as best seen in FIG. 8. Grooves 34 cut through front side 22, rear side 24 and bottom side 26 perpendicular to slot 32. Housing 12 has first mounting means 29 for slidably mounting housing 12 to wiper arm 11, as best seen in FIGS. 9 and 11. First mounting means 29 is mounted on top side 20 of housing 12. First mounting means 29 is preferably pairs of I-shaped flanges mounted in series down the length of top side 20. Housing 12 also has second mounting means 25 and 27 for slidably mounting wiper blade 17 to housing 12, as best seen in FIGS. 8 and 11. Second mounting means 25 and 27 is preferably a series of S-shaped flanges 25 and L-shaped flanges 27 mounted opposite each other and spaced intermittently down the length of housing 12. S-shaped flanges 25 are mounted on rear bottom side 26b. L-shaped flanges 27 are mounted on rear side 24 and extend downwards past rear bottom side 26b to oppose S-shaped flanges 25. Housing 12 is preferably rectangular in shape. Also, housing 12 is preferably an extruded housing with sufficient strength to allow bladder 14 to deploy in a direction vertical to windshield W without distortion.

Figure 2:
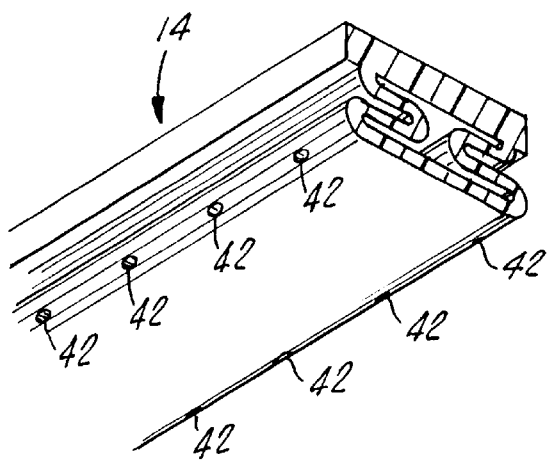
FIG. 2 is a top end perspective view of the bladder of the assembly of the present invention, shown in its normal deflated position.
Figure 4:
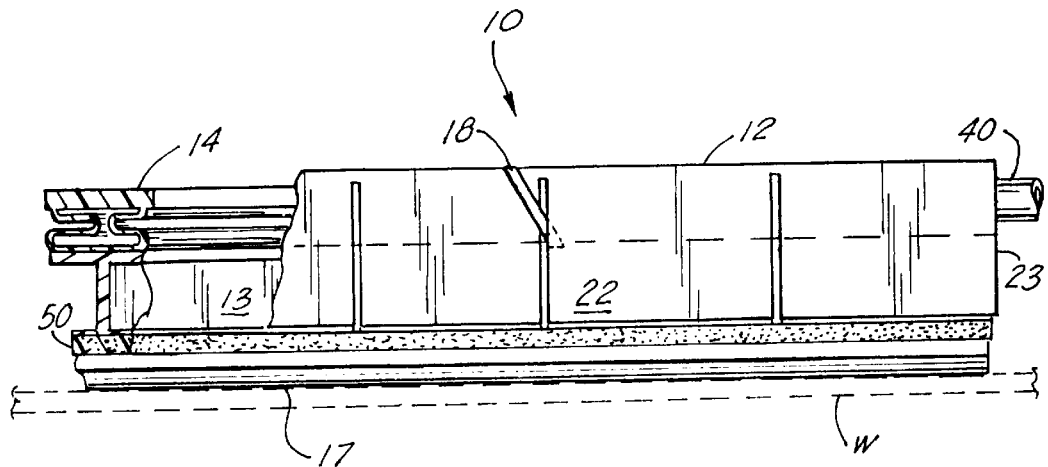
FIG. 4 is a fragmentary side view of the embodiment of FIG. 1, shown in its inoperative position, with the housing partially cut away to illustrate the bladder within the housing.

Bladder 14 is an elongated inflatable bladder located inside housing 12, as best seen in FIGS. 4–7. Bladder 14 has an outlet 40 which extends through hole 30 in end 23 of housing 12 and couples to washer fluid source 13, as best seen in FIGS. 1, 4, 5 and 10. Bladder 14 also has a series of perforations 42 which extend the length of bladder 14. Bladder 14 is normally in a deflated state, as best seen in FIGS. 2, 4 and 7. Preferably, bladder 14 contains two series of perforations 42 which extend the length of bladder 14. Also preferable, perforations 42 are small enough that bladder 14 remains inflated while washer fluid source 13 is supplying washer fluid F to bladder 14. Also preferable is that bladder 14 is extruded of flexible rubber-like material.

Washing means 16 includes brush or scrub pad 50 mounted on support 52, as best seen in FIGS. 6 and 7. Support 52 is an I-shaped beam, with a pair of flanges 54 extending the length of support 52 adjacent to scrub pad 50 and a larger pair of flanges 56 extending the length of support 52 which hold washing means 16 in slot 32 of housing 12. Support 52 is in contact with bladder 14 in housing 12. Washing means 16 is not in contact with windshield W when bladder 14 is deflated. Preferably, scrub pad 50 is extruded of a polymeric material and rolled around a mandrel while still hot to give scrub pad 50 a permanent memory in the shape of the curvature of windshield W.

Wiper blade 17 is a conventional wiper blade such as comes equipped with automobile A. Wiper blade 17 engages windshield W when bladder 14 is deflated.

In the preferred embodiment of assembly 10, deflating means 18 is a series of elastic bands mounted in grooves 34 of housing 12, as best seen in FIGS. 4 and 5. Deflating means 18 deflates bladder 14 when washer fluid source 13 stops supplying washer fluid F to bladder 14. Deflating means 18 may also be a rubber-like material used to make bladder 14, the rubber-like material having memory such that bladder 14 deflates when washer fluid source 13 stops supplying washer fluid F to bladder 14.

Figure 3:
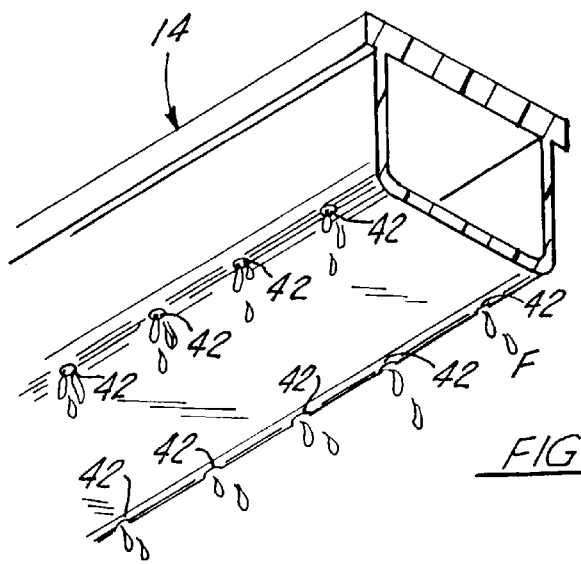
FIG. 3 is another top end perspective view of the bladder of FIG. 2, shown in its inflated position.

In operation, assembly 10 is slidably mounted on wiper arm 11 of automobile A such that wiper blade 17 and washing means 16 are facing windshield W, with wiper blade 17 engaging windshield W and washing means 16 not engaging windshield W, as best seen in FIG. 4. Source of windshield washer fluid under pressure 13 is coupled to bladder 14 through outlet 40. Upon actuation of source of windshield wiper fluid under pressure 13, washer fluid F is supplied under pressure from washer fluid source 13 to bladder 14, as indicated by arrow X in FIG. 5. Bladder 14 inflates with washer fluid F and leaks washer fluid F through perforations 42, as best seen in FIGS. 2, 3 and 10. As bladder 14 inflates with washer fluid F, bladder 14 expands in the direction of arrow A in FIG. 6, urging washing means 16 outwardly against windshield W. As washing means 16 engages windshield W, wiper blade 17 is disengaged from windshield W, as best seen in FIGS. 4 and 5. Washer fluid F leaks from perforations 42 through housing 12 and down washing means 16 to wet windshield W, as best seen in FIG.

5. As wiper arm 11 moves back and forth in an oscillating motion, washer fluid F wets windshield W and scrub pad 30 of washing means 16 scrubs solid matter from windshield W, thereby cleaning windshield W. After a predetermined time, washer fluid source 13 stops supplying washer fluid F to bladder 14. Deflating means 18 deflates bladder 14 in the direction of arrow B in FIG. 7, retracting and disengaging washing means 16 from windshield W and reengaging wiper blade 17 to windshield W, as best seen in FIGS. 4 and 7. The oscillating motion of wiper arm 11 allows wiper blade 17 to wipe away any remaining washer fluid F from windshield W.

Figure 12:
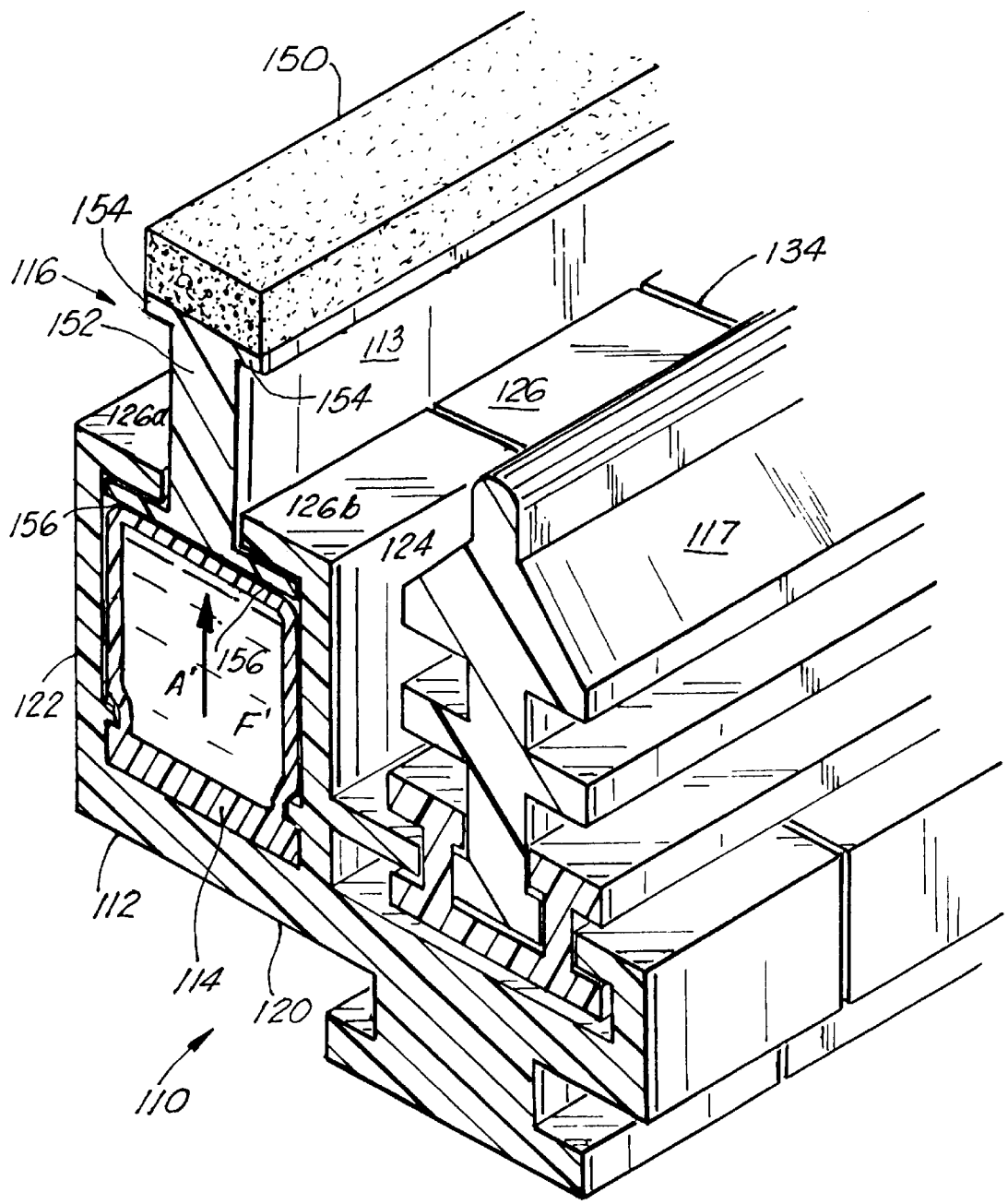
FIG. 12 is a bottom end perspective view of an alternate embodiment of FIGS. 1–11 with one end of the housing removed, illustrating the assembly in its operative position and how the wiper blade is inserted onto the housing; and, FIG. 13 is another bottom end perspective view of the embodiment of FIG. 12 with one end of the housing removed, illustrating the assembly in its inoperative position and how the wiper blade is inserted onto the housing.
Figure 13:
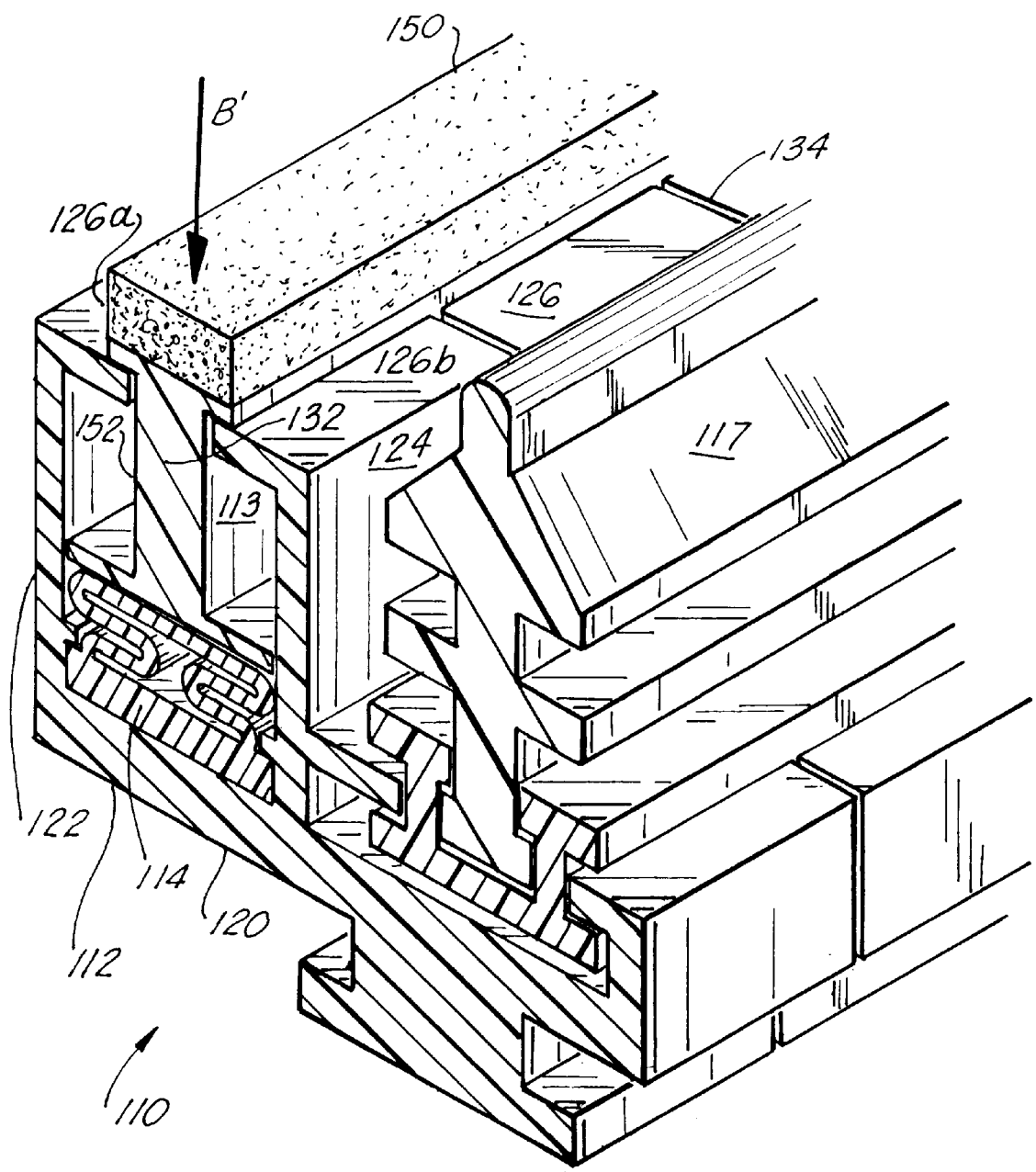

In the alternate embodiment of FIGS. 12 and 13, the "100 series" of numbering is used, thus, elements substantially similar to the preferred embodiment appear as the preferred element number plus 100 (thus, bladder 114 in the alternate embodiment is identical to bladder 14 in the preferred embodiment, etc.); and, arrows take on the "prime" designation in the alternate embodiment (thus, ARROW A' in the alternate embodiment of FIGS. 12 and 13 represents the same direction of movement as ARROW A in the preferred embodiment of FIGS. 1–11). Referring now to FIGS. 12 and 13, bladder 114 of assembly 110 is an elongated inflatable bladder located inside housing 112. Bladder 114 has an outlet (NOT SHOWN but identical to outlet 40 of the preferred embodiment) which extends through a hole (NOT SHOWN but identical to hole 30 of the preferred embodiment) in an end (NOT SHOWN but identical to end 23 of the preferred embodiment) of housing 112 and couples to washer fluid source 13, as best seen in FIGS. 1, 4, 5 and 10, of the preferred embodiment. Bladder 114 also has a series of perforations (NOT SHOWN but identical to perforations 42 of the preferred embodiment) which extend the length of bladder 114. Bladder 114 is normally in a deflated state, as best seen in FIG. 13 and expands, when inflated, to the position of FIG. 12. Preferably, bladder 114 contains two series of such perforations which extend the length of bladder 114. Also preferable, these perforations are small enough that bladder 114 remains inflated while washer fluid source 13 is supplying washer fluid F' to bladder 114. Also preferable is that bladder 114 is extruded of flexible rubber-like material.

Washing means 116 includes brush or scrub pad 150 mounted on support 152. Support 152 is an I-shaped beam, with a pair of flanges 154 extending the length of support 152 adjacent to scrub pad 150 and a larger pair of flanges 156 extending the length of support 152 which hold washing means 116 in slot 132 of housing 112. Support 152 is in contact with bladder 114 in housing 112. Washing means 116 is not in contact with windshield W when bladder 114 is deflated. Preferably, scrub pad 150 is extruded of a polymeric material and rolled around a mandrel while still hot to give scrub pad 150 a permanent memory in the shape of the curvature of windshield W.

Wiper blade 117 is a conventional wiper blade such as comes equipped with automobile A. Wiper blade 117 engages windshield W when bladder 114 is deflated.

As can be seen from the above description and accompanying drawing, the assembly of the present invention is simple in design, involving only a few parts.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A windshield washing and wiping assembly for cleaning a windshield of an automobile, the automobile having a windshield wiper arm affixed to motor means for moving the wiper arm in an oscillating motion, the assembly comprising:
    (a) an elongated housing having a pair of ends, one of said ends having a hole therein, and, a slot running the length thereof;
        (i) said housing having first mounting means for slidably mounting said housing to the wiper arm of said automobile; and,
        (ii) said housing having a series of grooves spaced intermittently along the length thereof, said grooves running through a portion of said housing and being perpendicular to said slot;
    (b) a source of windshield washer fluid under pressure;
    (c) a bladder located inside said housing, said bladder having an outlet which extends through said hole in said end of said housing and couples said washer fluid source to said bladder and a series of perforations running the length of said bladder, said bladder normally being deflated;
    (d) means for washing the windshield of the automobile mounted through said slot in said housing and in contact with said bladder, said washing means not being in contact with the windshield when said bladder is deflated;
    (e) a wiper blade mounted on said housing and in contact with the windshield when said bladder is deflated;
    (f) said housing having second mounting means for slidably mounting said wiper blade to said housing, said second mounting means being mounted on said housing opposite said first mounting means;
    (g) upon actuation of said source of windshield washer fluid under pressure, said washer fluid source supplies washer fluid under pressure to said bladder, inflating said bladder with washer fluid, urging said washing means against the windshield while simultaneously disengaging said wiper blade from the windshield; and,
    (h) means for deflating said bladder such that when said washer fluid source ceases supplying washer fluid to said bladder, said deflating means deflates said bladder, retracting and disengaging said washing means from the windshield and reengaging said wiper blade to the windshield.

2. The assembly of claim 1, wherein said bladder is extruded of flexible rubber-like material.

3. The assembly of claim 2, wherein said bladder has two series of said perforations and said perforations are small enough that said bladder remains inflated while said washer fluid source supplies washer fluid to said bladder.

4. The assembly of claim 3, wherein said first mounting means is pairs of I-shaped flanges, mounted in series down the length of said housing, which slidably engage the wiper arm of the automobile.

5. The assembly of claim 4, wherein said second mounting means is a series of S-shaped flanges and L-shaped flanges running the length of said housing in opposition to each other, said S-shaped flanges mounted on a bottom of said housing and said L-shaped flanges mounted on a rear of said housing and extending downwardly past said bottom, said flanges slidably engaging said wiper blade.

6. The assembly of claim 5, wherein said housing is substantially rectangular in shape and is an extruded housing with sufficient strength to allow said bladder to deploy in a direction vertical to the windshield of the automobile without distortion of said housing.

7. The assembly of claim 6, wherein said washing means includes a scrub pad extruded of a polymeric material and rolled around a mandrel while still hot to give said scrub pad a permanent memory in the shape of the curvature of the windshield on which said scrub pad is to operate.

8. The assembly of claim 7, wherein said deflating means is a rubber-like material used to make said bladder, said rubber-like material having memory such that said bladder deflates when said washer fluid source stops supplying washer fluid to said bladder.

9. The assembly of claim 7, wherein said deflating means is a series of elastic bands mounted in said grooves and engaging said bladder such that said bands deflate said bladder when said washer fluid source stops supplying washer fluid to said bladder.

10. A windshield washing and wiping assembly for cleaning a windshield of an automobile, the automobile having a windshield wiper arm affixed to motor means for moving the wiper arm in an oscillating motion, the assembly comprising:
(a) an elongated housing, substantially rectangular in shape, with a top, bottom, front, rear, and a pair of ends, one of said ends having a hole therein, and a slot running the length of said bottom of said housing;
  (i) said housing having first mounting means for slidably mounting said housing to the wiper arm of the automobile, said first mounting means mounted on said top of said housing; and
  (ii) said housing having a series of grooves spaced intermittently along the length thereof, said grooves running through said front, top and rear and being perpendicular to said slot;
(b) a source of windshield washer fluid under pressure;
(c) a bladder located inside said housing, said bladder having an outlet which extends through said hole in said end of said housing and couples said washer fluid source to said bladder and two series of perforations running the length of said bladder, said bladder normally being deflated;
(d) means for washing the windshield of the automobile mounted through said slot in said housing and in contact with said bladder, said washing means not being in contact with the windshield when said bladder is deflated;
(e) a wiper blade mounted on said bottom of said housing and in contact with the windshield when said bladder is deflated;
(f) said housing having second mounting means for slidably mounting said wiper blade to said bottom of said housing, said second mounting means being mounted on said rear and said bottom;
(g) upon actuation of said source of windshield washer fluid under pressure, said washer fluid source supplies washer fluid under pressure to said bladder, inflating said bladder with washer fluid, urging said washing means against the windshield while simultaneously disengaging said wiper blade from the windshield and leaking washer fluid onto said washing means and the windshield; and,
(h) means for deflating said bladder such that when said washer fluid source ceases supplying washer fluid to said bladder, said deflating means deflates said bladder, disengaging said washing means from the windshield and reengaging said wiper blade to the windshield.

11. The assembly of claim 10, wherein:
(a) said first mounting means is a pair of I-shaped flanges, mounted in series down the length of said top of said housing, which slidably engage the wiper arm of the automobile; and
(b) said second mounting means is mounted to the rear of said slot and comprises a series of S-shaped flanges and L-shaped flanges running the length of said bottom of said housing in opposition to each other, said S-shaped flanges mounted on said bottom and said L-shaped flanges mounted on said rear of said housing and extending down past said bottom, said flanges slidably engaging said wiper blade.

12. The assembly of claim 11, wherein said housing is an extruded housing with sufficient strength to allow said bladder to deploy in a direction vertical to the windshield of the automobile without distortion of said housing.

13. The assembly of claim 12, wherein said bladder is extruded of flexible rubber-like material.

14. The assembly of claim 13, wherein said perforations in said bladder are small enough that said bladder remains inflated while said washer fluid source supplies washer fluid to said bladder.

15. The assembly of claim 14, wherein said washing means includes a scrub pad extruded of a polymeric material and rolled around a mandrel while it is still hot enough to give said scrub pad a permanent memory in the shape of the curvature of the windshield on which said scrub pad is to operate.

16. The assembly of claim 15, wherein said deflating means is a rubber-like material used to make said bladder, said rubber-like material having memory such that said bladder deflates when said washer fluid source stops supplying washer fluid to said bladder.

17. The assembly of claim 15, wherein said deflating means is a series of elastic bands mounted in said grooves and engaging said bladder such that said bands deflate said bladder when said washer fluid source stops supplying washer fluid to said bladder.

18. A windshield washing and wiping assembly for cleaning a windshield of an automobile, the automobile having a windshield wiper arm affixed to motor means for moving the wiper arm in an oscillating motion, the assembly comprising:
(a) an elongated housing, substantially rectangular in shape, with a top, bottom, front, rear, and a pair of ends, one of said ends having a hole therein, and a slot running the length of said bottom of said housing;
  (i) said housing having a pair of I-shaped flanges, mounted in series down the length of said top, which slidably engage the wiper arm of the automobile; and,
  (ii) said housing having a series of grooves spaced intermittently along the length thereof, said grooves running through said front, top and rear and being perpendicular to said slot in said housing;
(b) a source of windshield washer fluid under pressure;
(c) a bladder located inside said housing, said bladder having an outlet which extends through said hole in said end of said housing and couples said washer fluid source to said bladder;
  (i) said bladder having two series of perforations running the length of said bladder;
  (ii) said perforations in said bladder are small enough that said bladder remains inflated while said washer fluid source supplies washer fluid to said bladder; and
  (iii) said bladder normally being deflated;

(d) means for washing the windshield of the automobile mounted through said slot in said housing and in contact with said bladder, said washing means not being in contact with the windshield when said bladder is deflated;

(e) a wiper blade mounted on said bottom of said housing and in contact with the windshield when said bladder is deflated;

(f) said housing having a series of S-shaped flanges and L-shaped flanges running the length of said bottom of said housing in opposition to each other, said S-shaped flanges mounted on said bottom and said L-shaped flanges mounted on said rear of said housing and extending down past said bottom, said flanges slidably engaging said wiper blade;

(g) upon actuation of said source of windshield washer fluid under pressure, said washer fluid source supplies washer fluid under pressure to said bladder, inflating said bladder with washer fluid, urging said washing means against the windshield while simultaneously disengaging said wiper blade from the windshield and leaking washer fluid onto said washing means and the windshield; and (h) means for deflating said bladder such that when said washer fluid source ceases supplying washer fluid to said bladder, said deflating means deflates said bladder, retracting and disengaging said washing means from the windshield and reengaging said wiper blade to the windshield.

19. The assembly of claim 18, wherein said deflating means is a rubber-like material used to make said bladder, said rubber-like material having memory such that said bladder deflates when said washer fluid source stops supplying washer fluid to said bladder.

20. The assembly of claim 18, wherein said deflating means is a series of elastic bands mounted in said grooves and engaging said bladder such that said bands deflate said bladder when said washer fluid source stops supplying washer fluid to said bladder.

* * * * *